3,184,520
CATALYTIC HYDRODEOXYGENATION PROCESS
Robert W. Roberts, Ponca City, Okla., assignor to Continental Oil Company, Ponca City, Okla., a corporation of Delaware
No Drawing. Filed Oct. 16, 1962, Ser. No. 231,000
9 Claims. (Cl. 260—683.9)

This invention relates to treatment of hydrocarbon streams containing aluminum alkoxides and/or oxygenated organic impurities. More specifically, this invention is concerned with the treatment of a by-product stream resulting from the manufacture of aluminum alkoxides from alkylaluminum compounds, so as to remove certain objectionable impurities and produce a useful hydrocarbon product.

In the method of manufacturing alcohols which has been disclosed in the literature by Dr. Karl Ziegler, the first step is the so-called growth reaction:

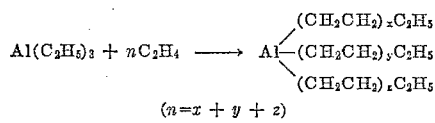

$$(n = x + y + z)$$

The growth product is then oxidized to aluminum alkoxides as the next step in the alcohol synthesis, customarily in the presence of an inert saturated hydrocarbon solvent.

Immediately following this stage of the process it may be found advisable to distill or strip the crude alkoxide product, removing therefrom lower boiling substances which include the saturated hydrocarbon solvent, olefins, lower molecular weight alkoxides, and trace quantities of such substances as aldehydes, alcohols, esters, peroxides, and other oxygenated organic compounds. This crude mixture, which may be referred to as a light distillate from aluminum alkoxide purification or aluminum alkoxide solvent stripper overhead, represents an appreciable waste in the alcohol process unless it is converted into a useful product. It is the principal object of this invention to provide an economical method for conversion of this crude by-product stream or any mixture containing hydrocarbons, aluminum compounds, and oxygenated organic compounds into a material consisting essentially of hydrocarbons possessing a minimum of unsaturation and free from oxygen and aluminum-containing impurities. Other objects and advantages will become apparent to those skilled in the art upon reading of the description which follows.

Briefly, I have discovered that these and other objectives may be accomplished by a process comprising the steps:

(a) Removing aluminum compounds from a mixture containing hydrocarbons, aluminum compounds, and oxygenated organic compounds, preferably by extraction with aqueous acid or by a fractional distillation, and (b) Reacting the aluminum-free product of step (a) with hydrogen under superatmospheric pressure and elevated temperature in the presence of a hydrogenation catalyst.

In a more specific aspect of the invention the aluminum compounds are removed from distillate obtained by distilling oxidized aluminum alkyl growth product.

In a plant in which alcohols are manufactured by the Ziegler process the typical aluminum alkoxide solvent stripper overhead stream is rich in olefins and contains about 3 to 5 weight percent oxygen present in the form of oxygen-containing organic compounds. In addition to the various oxygenated organic compounds, a small quantity of aluminum alkoxide is also present in this stream, probably as a result of entrainment during the stripping operation. Results of preparation of various blends of the crude stream in typical petroleum refinery products have shown blending to be an unacceptable means for disposing of this material. In every instance the blend was shown to have prohibitive gum content, poor color, and an objectionable odor. In addition, the by-product stream is deficient in heating value, as compared with kerosene. Catalytic hydrogenation offers a means of reducing the oxygen content, as well as the olefin content of the material to yield a hydrocarbon product with high heat content, less odor, and with more usefulness for the purposes for which saturated hydrocarbons are customarily employed. However, when it is attempted to hydrogenate this stream catalytically, the common supported hydrogenation catalysts are found to disintegrate rather rapidly. For example, all of the following commercial catalysts disintegrate on contact with untreated aluminum alkoxide solvent stripper overhead.

| Manufacturer and type | Composition |
|---|---|
| American Cyanamid HDS-3 | Nickel-molybdena on alumina. |
| Girdler G-3B | Iron oxide (shift). |
| Girdler G-22 | Barium-promoted copper chromite. |
| Girdler G-35B | Cobalt-molybdena on alumina. |
| Girdler G-42 | Iron oxide (desulfurization). |
| Girdler T-318 | Molybdenum disulfide on alumina. |
| Houdry series B | Cobalt-molybdena on alumina (non-gel). |
| Houdry series C | Cobalt-molybdena on alumina (gel). |
| Houdry | Nickel sulfide on kieselguhr. |

After a period of from one to two hours of operation with one of these catalysts, severe catalyst deterioration occurs, with clogging of screens and plugging of lines by debris of fine particle size.

I have discovered, however, that washing the stripper overhead with a dilute acid solution (e.g., 5 percent sulfuric) effectively removes aluminum alkoxides and thereby protects the deoxygenation catalyst. Acid strengths as low as 2 weight percent ($H_2SO_4$) can be used effectively. However, wash acid concentrations in excess of 40 weight percent produce a "char" and cause discoloration of the stripper overhead.

Any other pretreatment which effectively removes aluminum compounds (e.g., distillation) will suffice to protect the deoxygenation catalyst. Washing with aqueous acid and fractional distillation are both very effective and are preferred. The choice between the two preferred methods should be made primarily on the basis of specific economic, rather than technical considerations.

After removal of aluminum compounds from the aluminum alkoxide solvent stripper overhead, hydrodeoxygenation may be accomplished with the use of conventional supported hydrogenation catalyst including those listed above. Preferred catalysts consists of cobalt and/or nickel oxides in combination with molybdena on a suitable support such as alumina or silica-alumina. The following mild conditions effect essentially complete removal of combined oxygen from typical aluminum alkoxide solvent stripper overhead.

| | Preferred conditions | Operable ranges |
|---|---|---|
| Temperature, ° F. | 700 | 600–1,000. |
| Pressure, p.s.i.g. | 300 | Above 200. |
| Space velocity, vol./hr. vol. | 2.0 | 0.5 to 6.0. |
| Hydrogen recycle, s.c.f./bbl. | 2,000 | 600–5,000. |

The product resulting from treatment by the method of this invention may be separated by fractional distillation into useful hydrocarbon fractions which are indistinguishable from petroleum refinery distillates of comparable boiling ranges, and may be employed for similar purposes. It is preferred to recycle product of suitable boiling range to the aluminum alkoxide manufacturing operation as inert hydrocarbon solvent, since recycled hydrocarbon from the process of this invention is more uniform with respect to freedom from undesirable impurities than comparable petroleum refinery streams.

In order to disclose the present invention still more clearly, the following exemplified description is presented.

EXAMPLE

A fifteen-gallon quantity of aluminum alkoxide solvent stripper overhead (kerosene employed as solvent) was washed with a 5 percent by weight aqueous sulfuric acid solution and separated into two layers. The oil layer was filtered through cellulose fiber to remove suspended matter and dissolved water and was subsequently charged to the catalytic reactor for hydrodeoxygenation. No neutralization of residual acidity was required. The catalyst used was Houdry series C cobalt molybdate on alumina. The relatively mild operating conditions were 700° F., 300 p.s.i.g. 2.0 liquid hourly space velocity, and 2000 s.c.f./bbl. Results obtained are shown in Table I. Yields on acid-water washing, hydrotreating, and overall processing were 97.7, 101.5, and 99.2 volume percent, respectively. Total liquid yield from hydrotreating was 97.9 weight percent, coke laydown on catalyst was 2.17 weight percent (of catalyst), and hydrogen consumption was 305 s.c.f./bbl. An overall material balance on hydrotreating showed a 99.2 percent yield.

The hydrodeoxygenated product was fractionated and analyzed for sulfur content, bromine, saponification, hydroxyl, and carbonyl numbers. In Table I are shown the results, compared with results of a corresponding examination of untreated aluminum alkoxide solvent stripper overhead.

Table I.—Properties of Aluminum Alkoxide Solvent Stripper Overhead (Kerosene Solvent) Before and After Hydrodeoxygenation

ALUMINUM ALKOXIDE SOLVENT STRIPPER OVERHEAD

|  | 10 vol. Percent Fraction No. | | | | | | | | | |
|---|---|---|---|---|---|---|---|---|---|---|
|  | 1 | 2 | 3 | 4 | 5 | 6 | 7 | 8 | 9 | 10 |
| Sulfur, wt. percent | <0.01 | <0.10 | <0.01 | <0.01 | <0.01 | <0.01 | 0.02 | 0.02 | 0.05 | 0.11 |
| Bromine, g./100 g | 13.7 | 9.5 | 6.9 | 5.8 | 5.2 | 5.1 | 5.3 | 6.2 | 8.3 | 11.8 |
| Saponification, mg. KOH/g | 8.6 | 4.7 | 2.7 | 1.6 | 1.1 | 1.1 | 1.5 | 2.9 | 5.7 | 14.7 |
| Carbonyl, p.p.m. —C=O | 1,130 | 815 | 610 | 520 | 480 | 500 | 660 | 960 | 1,380 | dark |
| Hydroxyl, wt. percent —OH | 8.6 | 4.7 | 2.4 | 1.2 | 0.6 | 0.3 | 0.1 | 0.01 | nil | nil |

HYDRODEOXYGENATED PRODUCT

|  | 1 | 2 | 3 | 4 | 5 | 6 | 7 | 8 | 9 | 10 |
|---|---|---|---|---|---|---|---|---|---|---|
| Sulfur, wt. percent | <0.01 |  |  |  |  |  |  |  |  | <0.01 |
| Bromine, g./100 g | 0.9 | 1.0 | 0.7 | 0.6 | 0.9 | 0.6 | 0.9 | 0.8 | 0.8 | 0.9 |
| Saponification, mg. KOH/g | 0 | 0 | 0 | 0 | 0 | 0 | 0 | 0 | 0 | 0.8 |
| Carbonyl, p.p.m. —C=O | 21 | 9 | 3 | 22 | 10 | 21 | 46 | 32 | 35 | dark |
| Hydroxyl, wt. percent —OH | nil | 0.02 | 0.04 | nil | 0.02 | 0.04 | 0.02 | nil | nil | 0.01 |

The hydrodeoxygenated product was also separated into distillation fractions corresponding to typical refinery products and analyzed. The results are presented in Table II. These data support the conclusion that after treatment by the process of this invention, stripper overhead is converted to hydrocarbons which are indistinguishable from typical refinery products.

Table II.—Properties of Fractions of Hydrodeoxygenated Aluminum Alkoxide Solvent Stripper Overhead (Kerosene Solvent)

|  | Fraction 1, 225° F. cut point | Fraction 2, 225°–375° F. | Fraction 3, 375°–510° F. |
|---|---|---|---|
| Yield, volume percent | 6.70 | 26.13 | 66.38 |
| Gravity: | | | |
| ° API | 87.0 | 57.5 | 46.0 |
| Specific | 0.6476 | 0.7487 | 0.7972 |
| Sulfur, weight percent | <0.01 | <0.01 | <0.01 |
| Bromine, g./100 g | 0.9 | 0.8 | 0.8 |
| Saponification, mg. KOH/g | 0 | 0 | 0 |
| Carbonyl, p.p.m. —C=O | 21 | 8 | 31 |
| Hydroxyl, wt. percent —OH | nil | nil | nil |
| Doctor test | sweet | sweet |  |
| Paraffins | 99 | 73 |  |
| Olefins | 0 | 1 |  |
| Naphthenes | 0 | 21 |  |
| Aromatics | 1 | 5 |  |
| Octane No.: | | | |
| F-1 clear | 44.0 | 8 |  |
| +3 cc | 73.4 | 45.4 |  |
| Distillation, ASTM D-86: | | | |
| IBP | 81 | 249 | 362 |
| 5 | 99 | 270 | 384 |
| 10 | 106 | 274 | 390 |
| 20 | 122 | 289 | 400 |
| 30 | 137 | 300 | 407 |
| 40 | 146 | 319 | 414 |
| 50 | 151 | 330 | 422 |
| 60 | 154 | 340 | 430 |
| 70 | 155 | 348 | 440 |
| 80 | 156 | 357 | 453 |
| 90 | 160 | 366 | 475 |
| 95 | 173 | 382 | 502 |
| E.P. | 202 | 383 | 556 |
| Smoke point, mm |  |  | 30.3 |
| Freeze point, ° F |  |  | 0 |

It can be seen from the data presented above that the product obtained by the method of this invention is not only equivalent to petroleum refinery hydrocarbon streams of comparable boiling range, but is of very high purity with respect to sulfur and oxygen content. Other advantages and modifications which lie within the scope of the disclosed invention will be apparent to those who are skilled in the art. By way of illustration, other dilute acids such as hydrochloric, nitric and phosphoric may be employed for removal of aluminum, depending on economic considerations, and the method of this invention may be utilized as a means of cleaning up inert hydrocarbon diluents for recycling to a variety of processes in the field of organoaluminum chemistry.

The embodiments of the invention in which an exclusive property or privilege is claimed are defined as follows.

I claim:

1. In a process for manufacture of a hydrocarbon product where an aluminum alkyl compound is subjected to a growth reaction with an olefin in a reaction medium comprising said hydrocarbon, and wherein the resulting growth product in said hydrocarbon is oxidized to produce a reaction product comprising aluminum alkoxides in said hydrocarbon, the improvement comprising the steps:
   (a) removing aluminum compounds from the mixture containing hydrocarbons, aluminum compounds and oxygenated organic compounds, and
   (b) reacting the aluminum-free product of step (a) with hydrogen under superatmospheric pressure and elevated temperature in the presence of a hydrogenation catalyst.

2. The process of claim 1 in which aluminum compounds are removed in step (a) by washing with dilute aqueous acid.

3. The process of claim 1 in which aluminum compounds are removed in step (a) by fractional distillation.

4. The process of claim 1 in which the hydrogenation catalyst employed in step (b) consists of cobalt-molybdena on alumina.

5. The process of claim 1 in which the catalyst employed in step (b) consists of nickel-molybdena on alumina.

6. The process of claim 1 in which aluminum compounds are removed in step (a) by washing with 2 percent to 40 percent by weight aqueous sulfuric acid.

7. The process according to claim 6 in which in step (b) at temperature of 600–1000° F., a pressure above 200 p.s.i.g., a space velocity of 0.5 to 6.0 vol./hr. vol. and a hydrogen recycle of 600–5000 standard cu. ft./bbl. are employed in combination with a cobalt-molybdena on alumina catalyst.

8. Process according to claim 3 in which in step (b) a temperature of 600–1000° F., a pressure above 200 p.s.i.g., a space velocity of 0.5 to 6.0 vol./hr. vol. and a hydrogen recycle of 600–5000 standard cu. ft./bbl. are employed in combination with a cobalt-molybdena on alumina catalyst.

9. The process according to claim 7 in which in step (b) a temperature of 700° F., a pressure of 300 p.s.i.g., a space velocity of 2.0 vol./hr. vol. and a hydrogen recycle of 2000 standard cu. ft./bbl. are employed in combination with a cobalt-molybdena on alumina catalyst.

References Cited by the Examiner

UNITED STATES PATENTS

| | | | |
|---|---|---|---|
| 3,030,402 | 4/62 | Krishenbaum et al. | 208—448 |
| 3,113,167 | 12/63 | Saver | 208—683.9 |

ALPHONSO D. SULLIVAN, *Primary Examiner.*

UNITED STATES PATENT OFFICE
CERTIFICATE OF CORRECTION

Patent No. 3,184,520 May 18, 1965

Robert W. Roberts

It is hereby certified that error appears in the above numbered patent requiring correction and that the said Letters Patent should read as corrected below.

Column 2, line 41, for "prereatment" read -- pretreatment --; columns 3 and 4, Table I, third column, line 1 thereof, for "<0.10" read -- <0.01 --.

Signed and sealed this 23rd day of November 1965.

(SEAL)
Attest:

ERNEST W. SWIDER
Attesting Officer

EDWARD J. BRENNER
Commissioner of Patents